US012620919B2

(12) United States Patent
Chen et al.

(10) Patent No.: US 12,620,919 B2
(45) Date of Patent: May 5, 2026

(54) MOTOR DRIVER FOR STARTING UP MOTOR HAVING ANY RESISTANCE

(71) Applicant: ANPEC ELECTRONICS CORPORATION, Hsinchu (TW)

(72) Inventors: Kun-Min Chen, Hsinchu City (TW); Yi-Cheng Liu, New Taipei City (TW); Yen-Ping Wang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 226 days.

(21) Appl. No.: 18/741,795

(22) Filed: Jun. 13, 2024

(65) Prior Publication Data

US 2025/0330108 A1 Oct. 23, 2025

(30) Foreign Application Priority Data

Apr. 22, 2024 (TW) ................................. 113114844

(51) Int. Cl.
| | |
|---|---|
| *H02P 21/34* | (2016.01) |
| *H02P 21/18* | (2016.01) |
| *H02P 21/22* | (2016.01) |
| *H02P 23/14* | (2006.01) |
| *H02P 27/14* | (2006.01) |

(52) U.S. Cl.
CPC .............. *H02P 21/34* (2016.02); *H02P 21/18* (2016.02); *H02P 21/22* (2016.02); *H02P 23/14* (2013.01); *H02P 27/14* (2013.01)

(58) Field of Classification Search
CPC .......... H02P 21/34; H02P 21/18; H02P 21/22; H02P 23/01; H02P 27/14
See application file for complete search history.

(56) References Cited

U.S. PATENT DOCUMENTS

| | | | |
|---|---|---|---|
| 2013/0154526 A1* | 6/2013 | Choi ..................... | G01R 35/005 318/400.04 |
| 2015/0207443 A1* | 7/2015 | Bian ....................... | H02P 6/153 318/400.14 |

* cited by examiner

*Primary Examiner* — Zoheb S Imtiaz
(74) *Attorney, Agent, or Firm* — Li & Cai Intellectual Property Office

(57) ABSTRACT

A motor driver for starting up a motor having any resistance is provided. The motor driver outputs a motor startup signal to the motor according to an initial startup duty cycle, senses a current value of a current signal of the motor multiple times, compares the current value of the motor that is sensed for multiple times with a reference current value and accordingly sets a plurality of pulse waves of a pulse width modulation signal. Then, the motor driver detects duty cycles of the pulse waves of the pulse width modulation signal as startup detection duty cycles. Then, the motor driver outputs a motor startup signal to the motor according to the startup detection duty cycles.

19 Claims, 8 Drawing Sheets

MOTOR DRIVER FOR STARTING UP MOTOR HAVING ANY RESISTANCE

CROSS-REFERENCE TO RELATED PATENT APPLICATION

This application claims the benefit of priority to Taiwan Patent Application No. 113114844, filed on Apr. 22, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver for starting up a motor having any resistance.

BACKGROUND OF THE DISCLOSURE

Fans are often used to cool down processors and other heat-generating components in electronic devices. In a conventional motor driver, a control circuit controls a driver circuit to drive a high-side switch and a low-side switch for starting up a motor of the fan.

However, no matter what a resistance of the motor of the fan is, the driver circuit of the conventional motor driver outputs a driving signal having a constant duty cycle to a control terminal of the high-side switch for driving the high-side switch. Since the motors of the fans may have different resistances, the driving signal having the constant duty cycle is not applicable for various resistances of the motors.

For example, when the constant duty cycle of the driving signal outputted by the conventional motor driver is a small value and is used for starting up a motor having a large resistance, only a small current flows through the motor having the large resistance. As a result, the motor having the large resistance cannot be successfully started up.

SUMMARY OF THE DISCLOSURE

In response to the above-referenced technical inadequacies, the present disclosure provides a motor driver for starting up a motor having any resistance. The motor driver includes a motor driving circuit, a motor driving circuit and a duty cycle detecting circuit. The motor driving circuit is connected to a motor. The motor driving circuit is configured to output a motor starting signal to the motor according to an initial startup duty cycle within an initial startup time interval in a motor startup mode. The current limiting circuit is connected to the motor. The current limiting circuit, within the initial startup time interval in the motor startup mode, senses a current value of a current signal of the motor multiple times, compares the current value of the current signal sensed each time with a reference current value to generate a current sensed result, sets a plurality of pulse waves of a pulse width modulation signal according to the current sensed result, and outputs the pulse width modulation signal. The duty cycle detecting circuit is connected to the current limiting circuit and the motor driving circuit. The duty cycle detecting circuit, within a duty cycle detection time interval in the motor startup mode, detects a duty cycle of each of the plurality of pulse waves of the pulse width modulation signal as a startup detection duty cycle, and outputs a duty cycle detected signal according to the startup detection duty cycle of each of the plurality of pulse waves of the pulse width modulation signal. The motor driving circuit, within a modulation startup time interval in the motor startup mode, sets a modulation startup duty cycle according to the duty cycle detected signal from the duty cycle detecting circuit, and outputs the motor starting signal to the motor according to the modulation startup duty cycle.

As described above, the present disclosure provides the motor driver for starting up the motor having any resistance. The motor driver of the present disclosure compares the current of the motor sensed for multiple times with the reference current value for setting the plurality of pulse waves of the pulse width modulation signal. Further, the motor driver of the present disclosure sets the motor starting signal for starting up the motor, according to the duty cycles of the plurality of pulse waves of the pulse width modulation signal. The motor driver of the present disclosure is capable of calculating a resistance of the motor according to the duty cycles of the plurality of pulse waves of the pulse width modulation signal, the common voltage and the reference current value. The motor driver of the present disclosure is capable of setting the motor starting signal according to the resistance of the motor. Therefore, when the motor driver of the present disclosure receives the common voltage having any voltage value for starting up the motor, the motor driver of the present disclosure adjusts a starting torque to an appropriate value (such as a constant value) that is larger than a minimum torque required for successfully starting up the motor such that a current signal having a plurality of desired waveforms flows through the motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
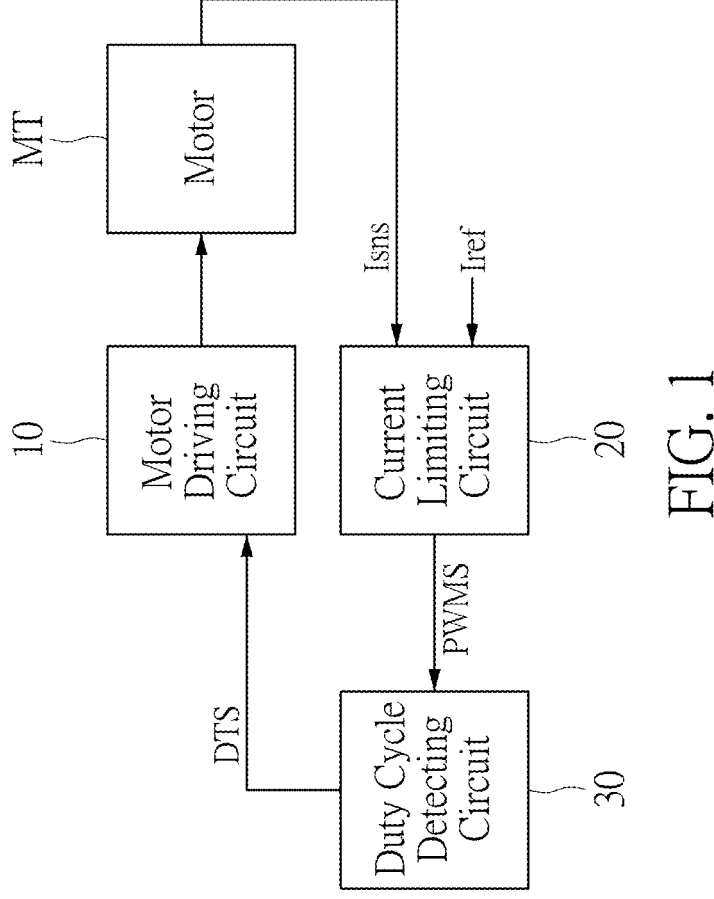
FIG. 1 is a block diagram of a motor driver for starting up a motor having any resistance according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a motor driver for starting up a motor having any resistance according to a first embodiment of the present disclosure.

The motor driver of the present disclosure includes a motor driving circuit 10, a current limiting circuit 20 and a duty cycle detecting circuit 30. The motor driving circuit 10 and the current limiting circuit 20 are connected to a motor MT. The duty cycle detecting circuit 30 is connected to the current limiting circuit 20 and the motor driving circuit 10.

Within an initial startup time interval in a motor startup mode, the motor driving circuit 10 outputs a motor starting signal to the motor MT according to an initial startup duty cycle. For example, duty cycles of one or more of a plurality of waveforms of the motor starting signal are equal to the initial startup duty cycle. The initial startup duty cycle is a duty cycle that is initially set and may be stored in the motor driving circuit 10.

Within the initial startup time interval in the motor startup mode, the current limiting circuit 20 senses a current value of a current signal Isns of the motor MT multiple times, and compares the current value of the current signal Isns sensed each time with a reference current value Iref to generate a current sensed result.

The current limiting circuit 20 sets (duty cycles of) a plurality of pulse waves of a pulse width modulation signal PWMS according to the current sensed result, and outputs the pulse width modulation signal PWMS.

After the initial startup time interval in the motor startup mode ends, the motor driver of the present disclosure enters a duty cycle detection time interval in the motor startup mode.

Within the duty cycle detection time interval in the motor startup mode, the duty cycle detecting circuit 30 detects the duty cycle of each of the plurality of pulse waves of the pulse width modulation signal PWMS from the current limiting circuit 20, as a startup detection duty cycle. The duty cycle detecting circuit 30 outputs a duty cycle detected signal DTS according to the startup detection duty cycle of each of the plurality of pulse waves of the pulse width modulation signal PWMS. For example, duty cycles of a plurality of waveforms of the duty cycle detected signal DTS are respectively equal to the startup detection duty cycles of the plurality of pulse waves of the pulse width modulation signal PWMS. All or some of the startup detection duty cycles may be equal to or different from each other.

After the duty cycle detection time interval in the motor startup mode ends, the motor driver of the present disclosure enters a modulation startup time interval in the motor startup mode.

Within the modulation startup time interval in the motor startup mode, the motor driving circuit 10 sets a modulation startup duty cycle according to the startup detection duty cycle of the duty cycle detected signal DTS from the duty cycle detecting circuit 30.

Within the modulation startup time interval in the motor startup mode, the motor driving circuit 10 outputs the motor starting signal to the motor MT according to the modulation startup duty cycle. For example, duty cycles of one or more of a plurality of waveforms of the motor starting signal are equal to the modulation startup duty cycle.

Figure 2:
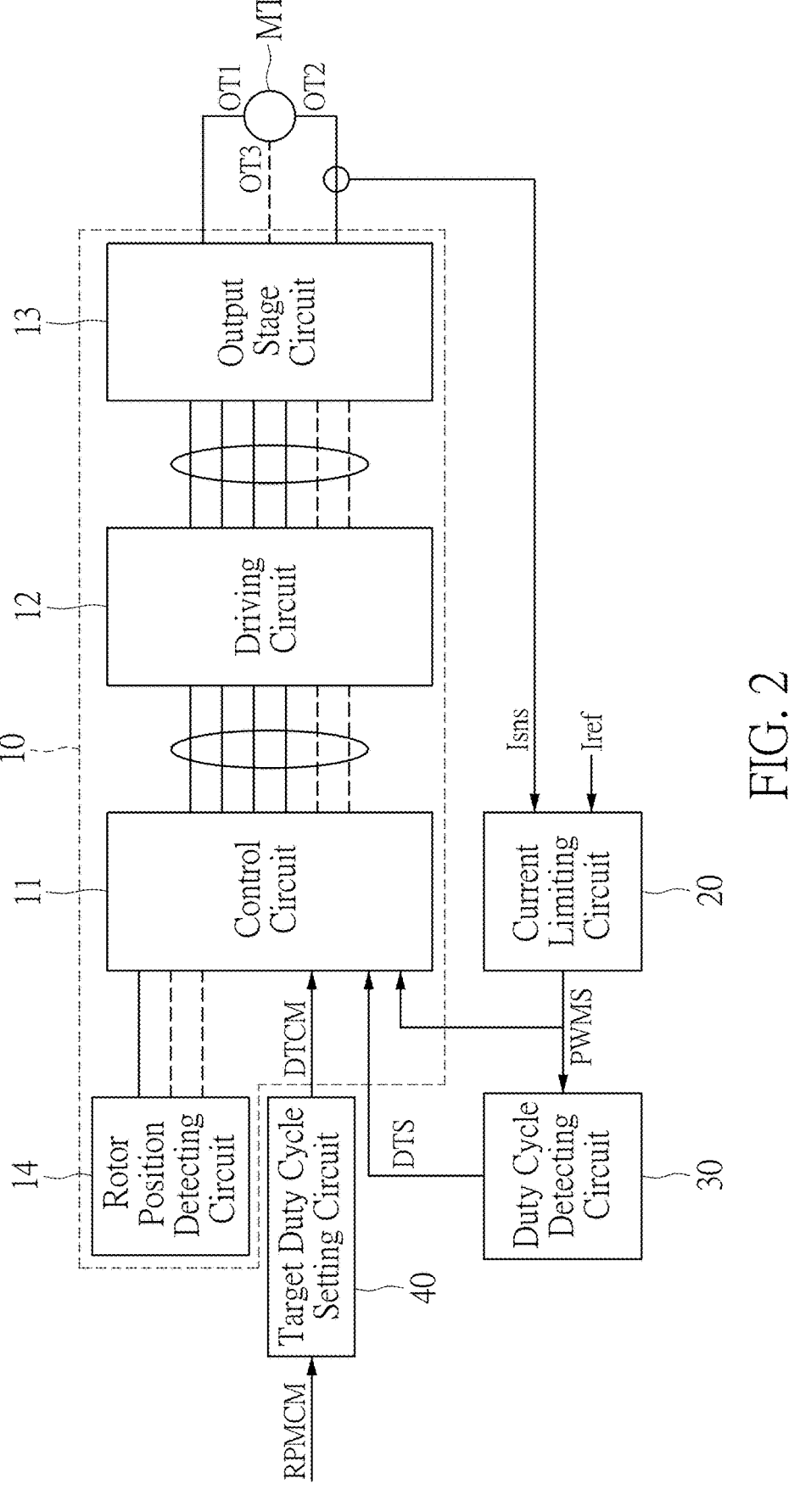
FIG. 2 is a block diagram of a motor driver for starting up a motor having any resistance according to a second embodiment of the present disclosure.

Reference is made to FIG. 2, which is a block diagram of a motor driver for starting up a motor having any resistance according to a second embodiment of the present disclosure.

The motor driver of the present disclosure includes the motor driving circuit 10, the current limiting circuit 20 and the duty cycle detecting circuit 30. In the second embodiment, the motor driving circuit 10 may include a control circuit 11, a driving circuit 12 and an output stage circuit 13.

If necessary, the motor driver of the present disclosure may further include a target duty cycle setting circuit 40, and the motor driving circuit 10 may further include a rotor position detecting circuit 14.

The control circuit 11 is connected to the driving circuit 12, the rotor position detecting circuit 14, the duty cycle detecting circuit 30 and the target duty cycle setting circuit 40. The output stage circuit 13 is connected to the driving circuit 12 and the motor MT. The current limiting circuit 20 is connected to the motor MT and the duty cycle detecting circuit 30.

Within the initial startup time interval in the motor startup mode, the control circuit 11 outputs a startup control signal according to the initial startup duty cycle (that is the duty cycle set initially), the driving circuit 12 outputs a startup driving signal according to the startup control signal from the control circuit 11. The output stage circuit 13 operates to output the motor starting signal to the motor MT according to the startup driving signal from the driving circuit 12 for initially starting up the motor MT.

Within the initial startup time interval in the motor startup mode, the current limiting circuit 20 senses the current value of the current signal Isns of the motor MT for multiple times, and compares the current value of the current signal Isns sensed each time with the reference current value Iref to generate the current sensed result.

Within the initial startup time interval in the motor startup mode, the current limiting circuit 20 sets the plurality of pulse waves of the pulse width modulation signal PWMS according to the current sensed result, and outputs the pulse width modulation signal PWMS.

After the initial startup time interval in the motor startup mode ends, the motor driver of the present disclosure enters the duty cycle detection time interval in the motor startup mode.

Within the duty cycle detection time interval in the motor startup mode, the duty cycle detecting circuit 30 detects the duty cycle of each of the plurality of pulse waves of the pulse width modulation signal PWMS from the current limiting circuit 20 as the startup detection duty cycle.

Within the duty cycle detection time interval in the motor startup mode, the duty cycle detecting circuit 30 outputs the duty cycle detected signal DTS according to the startup detection duty cycle of each of the plurality of pulse waves of the pulse width modulation signal PWMS.

For example, the duty cycles of the plurality of waveforms of the duty cycle detected signal DTS are respectively equal to the startup detection duty cycles of the plurality of pulse waves of the pulse width modulation signal PWMS.

For example, within the duty cycle detection time interval in the motor startup mode, the duty cycle detecting circuit 30 sets the startup detection duty cycle that is outputted when the current signal Isns reaches the reference current value Iref as a startup reference duty cycle, and outputs the duty cycle detected signal DTS having the startup reference duty cycle. Then, the control circuit 11 sets the modulation startup duty cycle according to the startup reference duty cycle of the duty cycle detected signal DTS from the duty cycle detecting circuit 30.

For example, within the duty cycle detection time interval in the motor startup mode, the control circuit 11 multiplies the startup detection duty cycle instructed by the duty cycle detected signal DTS from the duty cycle detecting circuit 30 by a preset gain to form the modulation startup duty cycle. In other words, the control circuit 11 may amplify the startup detection duty cycle instructed by the duty cycle detection signal DTS by N times to form the modulation startup duty cycle, wherein N is any appropriate positive value.

After the duty cycle detection time interval in the motor startup mode ends, the motor driver of the present disclosure enters the modulation startup time interval in the motor startup mode.

Within the modulation startup time interval in the motor startup mode, the control circuit 11 outputs the startup control signal according to the modulation startup duty cycle, the driving circuit 12 outputs the startup driving signal according to the startup control signal from the control circuit 11, and the output stage circuit 13 operates to output the motor starting signal to the motor MT according to the startup driving signal from the driving circuit 12.

Within the modulation startup time interval in the motor startup mode, the control circuit 11 may perform an equation of:

$$Istup = VCC \times PWMstup/Rmt = Iref \times DTstup/DTref$$

$$\rightarrow DTstup = (Istup/Iref) \times DTref,$$

wherein Istup represents a current of the motor MT that is generated when the control circuit 11 outputs the startup control signal having the modulation startup duty cycle, VCC represents the common voltage, PWMstup represents the modulation startup duty cycle of the startup control signal or the motor starting signal, Rmt represents a resistance of the motor MT, Iref represents the reference current value, DTstup represents a digital value of the modulation startup duty cycle of the startup control signal or the motor starting signal, and DTref represents a digital value of the startup detection duty cycle.

The preset gain described herein may be obtained by dividing the digital value DTstup of the modulation startup duty cycle by the digital value DTref of the startup detection duty cycle.

After the modulation startup time interval in the motor startup mode ends, the motor driver of the present disclosure drives the motor MT to enter a motor steady state rotation mode.

In the motor steady state rotation mode, the target duty cycle setting circuit 40 may output a target duty cycle instructing signal DTCM according to a target rotational speed instructed by a target rotational speed instruction RPMCM (from an external target instruction circuit). Then, the control circuit 11 outputs a rotation control signal according to the target duty cycle instructing signal DTCM from the target duty cycle setting circuit 40. Then, the driving circuit 12 outputs a rotation driving signal to the output stage circuit 13 according to the rotation control signal from the control circuit 11. Then, the output stage circuit 13 outputs a motor rotation driving signal to the motor MT according to the rotation driving signal from the driving circuit 12 for driving the motor MT.

In addition, in the motor startup mode and the motor steady state rotation mode, the rotor position detecting circuit 14 may detect a position of a rotor of the motor MT to output a rotor position detected signal. Then, the control circuit 11 may control the driving circuit 12 to drive the output stage circuit 13 according to the rotor position detected signal from the rotor position detecting circuit 14 for starting up and driving the motor MT.

Figure 3:
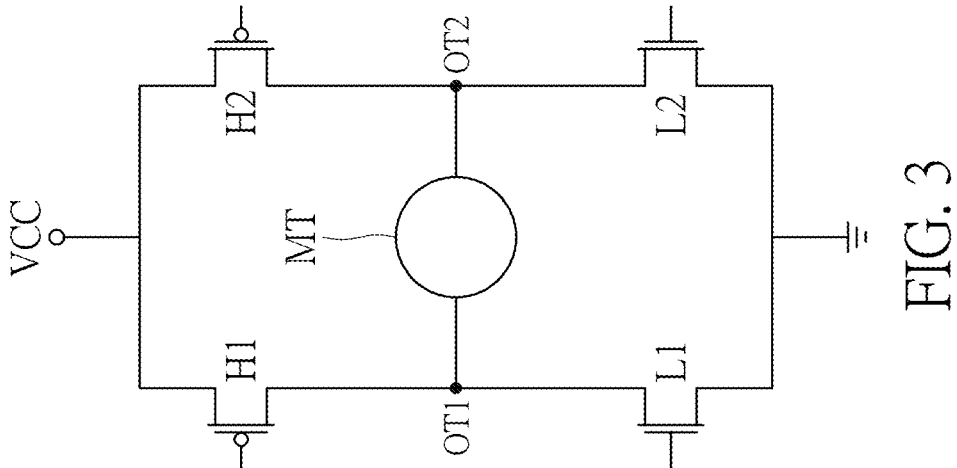
FIG. 3 is a circuit diagram of a single-phase motor and an output stage circuit of a motor driver for starting up a motor having any resistance according to a third embodiment of the present disclosure.

Reference is made to FIG. 3, which is a circuit diagram of a single-phase motor and an output stage circuit of a motor driver for starting up a motor having any resistance according to a third embodiment of the present disclosure.

The motor MT driven by the motor driver of the present disclosure may be a single-phase motor having a first terminal OT1 and a second terminal OT2 as shown in FIG. 3. Under this condition, the output stage circuit 13 shown in FIG. 2 may include a first high-side switch HS1, a first low-side switch LS1, a second high-side switch HS2 and a second low-side switch LS2 as shown in FIG. 3.

A first terminal of the first high-side switch HS1 is coupled with the common voltage VCC. A first terminal of the first low-side switch LS1 is connected to a second terminal of the first high-side switch HS1. A node between the first terminal of the first low-side switch LS1 and the second terminal of the first high-side switch HS1 is connected to the first terminal OT1 of the motor MT. A second terminal of the first low-side switch LS1 is grounded.

A first terminal of the second high-side switch HS2 is coupled with the common voltage VCC. A first terminal of the second low-side switch LS2 is connected to a second terminal of the second high-side switch HS2. A node between the first terminal of the second low-side switch LS2 and the second terminal of the second high-side switch HS2 is connected to the second terminal OT2 of the motor MT. A second terminal of the second low-side switch LS2 is grounded.

A control terminal of the first high-side switch HS1, a control terminal of the first low-side switch LS1, a control terminal of the second high-side switch HS2 and a control terminal of the second low-side switch LS2 are connected to the driving circuit 12. The driving circuit 12 drives the first high-side switch HS1, the first low-side switch LS1, the second high-side switch HS2 and the second low-side switch LS2.

Figure 4:
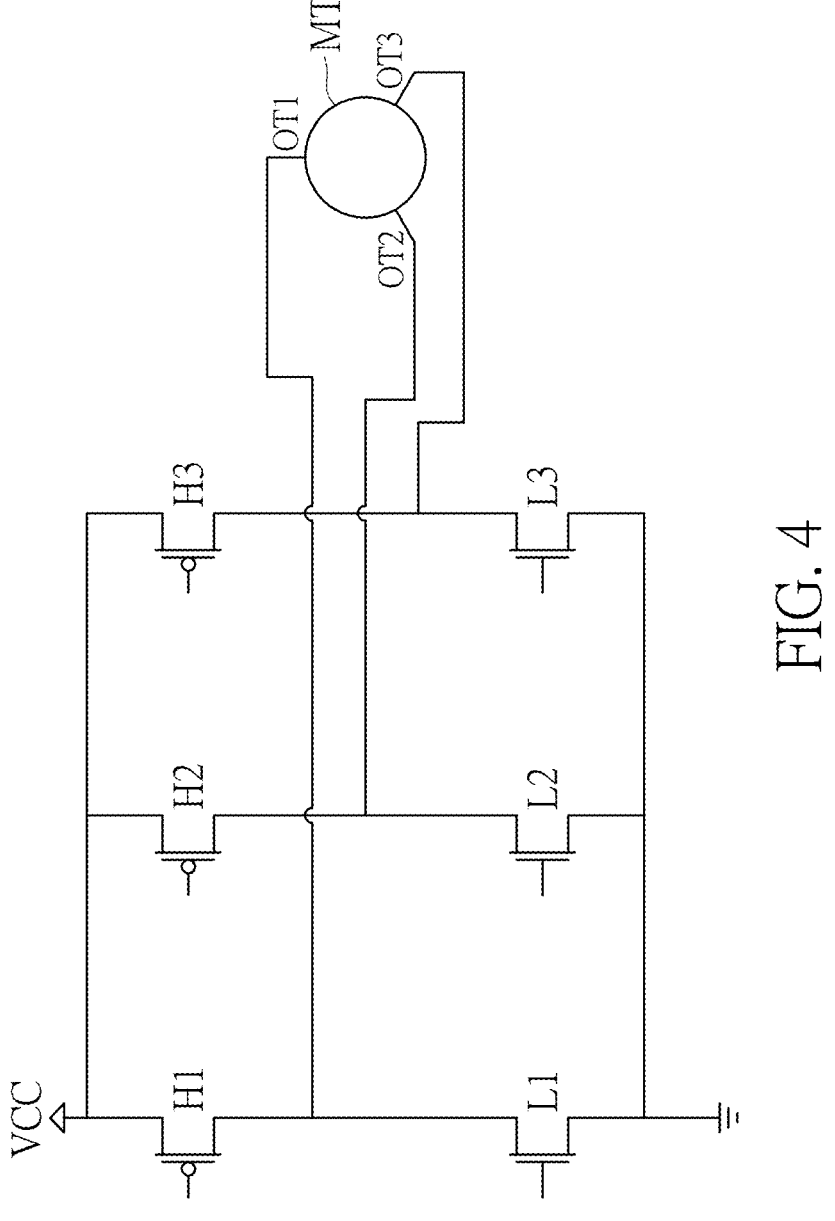
FIG. 4 is a circuit diagram of a three-phase motor and an output stage circuit of a motor driver for starting up a motor having any resistance according to a fourth embodiment of the present disclosure.

Reference is made to FIG. 4, which is a circuit diagram of a three-phase motor and an output stage circuit of a motor driver for starting up a motor having any resistance according to a fourth embodiment of the present disclosure.

The motor MT driven by the motor driver of the present disclosure may be a three-phase motor having the first terminal OT1, the second terminal OT2 and a third terminal OT3 as shown in FIG. 4. Under this condition, the output stage circuit 13 shown in FIG. 2 may include the first high-side switch HS1, the first low-side switch LS1, the second high-side switch HS2, the second low-side switch LS2, a third high-side switch HS3 and a third low-side switch LS3 as shown in FIG. 4.

The first terminal of the first high-side switch HS1 is coupled with the common voltage VCC. The first terminal of the first low-side switch LS1 is connected to the second terminal of the first high-side switch HS1. The node between the first terminal of the first low-side switch LS1 and the second terminal of the first high-side switch HS1 is connected to the first terminal OT1 such as a U-phase terminal of the motor MT. The second terminal of the first low-side switch LS1 is grounded.

The first terminal of the second high-side switch HS2 is coupled with the common voltage VCC. The first terminal of the second low-side switch LS2 is connected to the second terminal of the second high-side switch HS2. The node between the first terminal of the second low-side switch LS2 and the second terminal of the second high-side switch HS2 is connected to the second terminal OT2 such as a V-phase terminal of the motor MT. The second terminal of the second low-side switch LS2 is grounded.

A first terminal of the third high-side switch HS3 is coupled with the common voltage VCC. A first terminal of the third low-side switch LS3 is connected to a second terminal of the third high-side switch HS3. A node between the first terminal of the third low-side switch LS3 and the second terminal of the third high-side switch HS3 is connected to the third terminal OT3 such as a W-phase terminal of the motor MT. A second terminal of the third low-side switch LS3 is grounded.

The control terminal of the first high-side switch HS1, the control terminal of the first low-side switch LS1, the control terminal of the second high-side switch HS2, the control terminal of the second low-side switch LS2, a control terminal of the third high-side switch HS3 and a control terminal of the third low-side switch LS3 are connected to the driving circuit 12. The driving circuit 12 drives the first high-side switch HS1, the first low-side switch LS1, the second high-side switch HS2, the second low-side switch LS2, the third high-side switch HS3 and the third low-side switch LS3.

Figure 5:
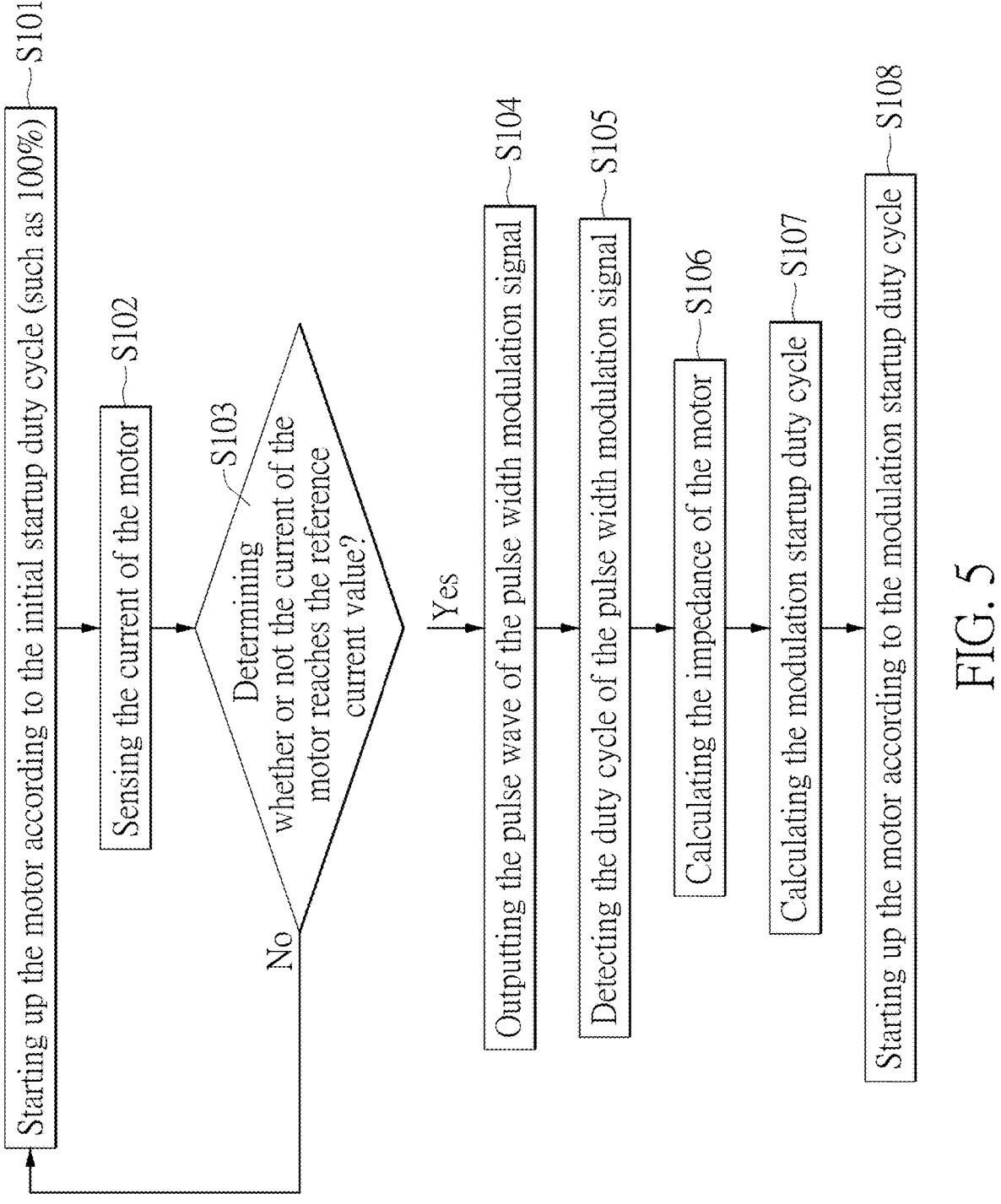
FIG. 5 is a flowchart diagram of a motor driver for starting up a motor having any resistance according to a fifth embodiment of the present disclosure.

Reference is made to FIG. 5, which is a flowchart diagram of a motor driver for starting up a motor having any resistance according to a fifth embodiment of the present disclosure.

The motor driver of the present disclosure such as the motor driver shown in FIG. 2 may perform processes S101 to S108 shown in FIG. 5.

In process S101, within the initial startup time interval in the motor startup mode, the control circuit 11 outputs the startup control signal having the initial startup duty cycle (such as, but not limited to, 100%), then the driving circuit 12 outputs the startup driving signal according to the startup control signal having the initial startup duty cycle from the control circuit 11, and then the output stage circuit 13 operates to output the motor starting signal to the motor MT according to the startup driving signal from the driving circuit 12 for initially starting up the motor MT.

In process S102, within the initial startup time interval in the motor startup mode, the current limiting circuit 20 senses the current of the motor MT.

In process S103, within the duty cycle detection time interval in the motor startup mode, the current limiting circuit 20 determines whether or not the sensed current of the motor MT reaches the reference current value Iref. If the sensed current of the motor MT does not reach the reference current value Iref, process S101 is performed again. In process S101, the control circuit 11 continually outputs the motor starting signal having the initial startup duty cycle (such as, but not limited to, 100%). Conversely, if the sensed current of the motor MT reaches the reference current value Iref, process S104 is performed.

In process S104, within the duty cycle detection time interval in the motor startup mode, the current limiting circuit 20 outputs the pulse width modulation signal PWMS having one or more pulse waves according to a comparison result or a difference between the sensed current and the reference current value Iref.

In process S105, within the duty cycle detection time interval in the motor startup mode, the duty cycle detecting circuit 30 detects the duty cycle of each of the plurality of pulse waves of the pulse wave modulation signal PWMS from the current limiting circuit 20 as the startup detection duty cycle, and outputs the duty cycle detected signal DTS having the startup detection duty cycle.

In process S106, within the duty cycle detection time interval in the motor startup mode, the control circuit 11 estimates the resistance of the motor MT according to the common voltage VCC, the startup detection duty cycle of the duty cycle detected signal DTS and the reference current value Iref.

In detail, within the duty cycle detection time interval in the motor startup mode, the control circuit 11 calculates the resistance of the motor MT using an equation of:

$$Rmt = VCC \times PWMref/Iref$$
$$= VCC \times \{DTref/(2n - 1)\}/Iref,$$

wherein Rmt represents the resistance of the motor MT, VCC represents the common voltage, PWMref represents the duty cycle of the pulse wave of the pulse width modulation signal PWMS, DTref represents the digital value of the startup detection duty cycle, n represents the number of bits, and Iref represents the reference current value.

In process S107, within the duty cycle detection time interval in the motor startup mode, the control circuit 11 sets the modulation startup duty cycle according to the resistance of the motor MT.

In process S108, the control circuit 11 outputs the startup control signal having the modulation startup duty cycle, the driving circuit 12 outputs the startup driving signal according to the startup control signal, and the output stage circuit 13 operate to output the motor starting signal to the motor MT according to the startup driving signal.

Figure 6:
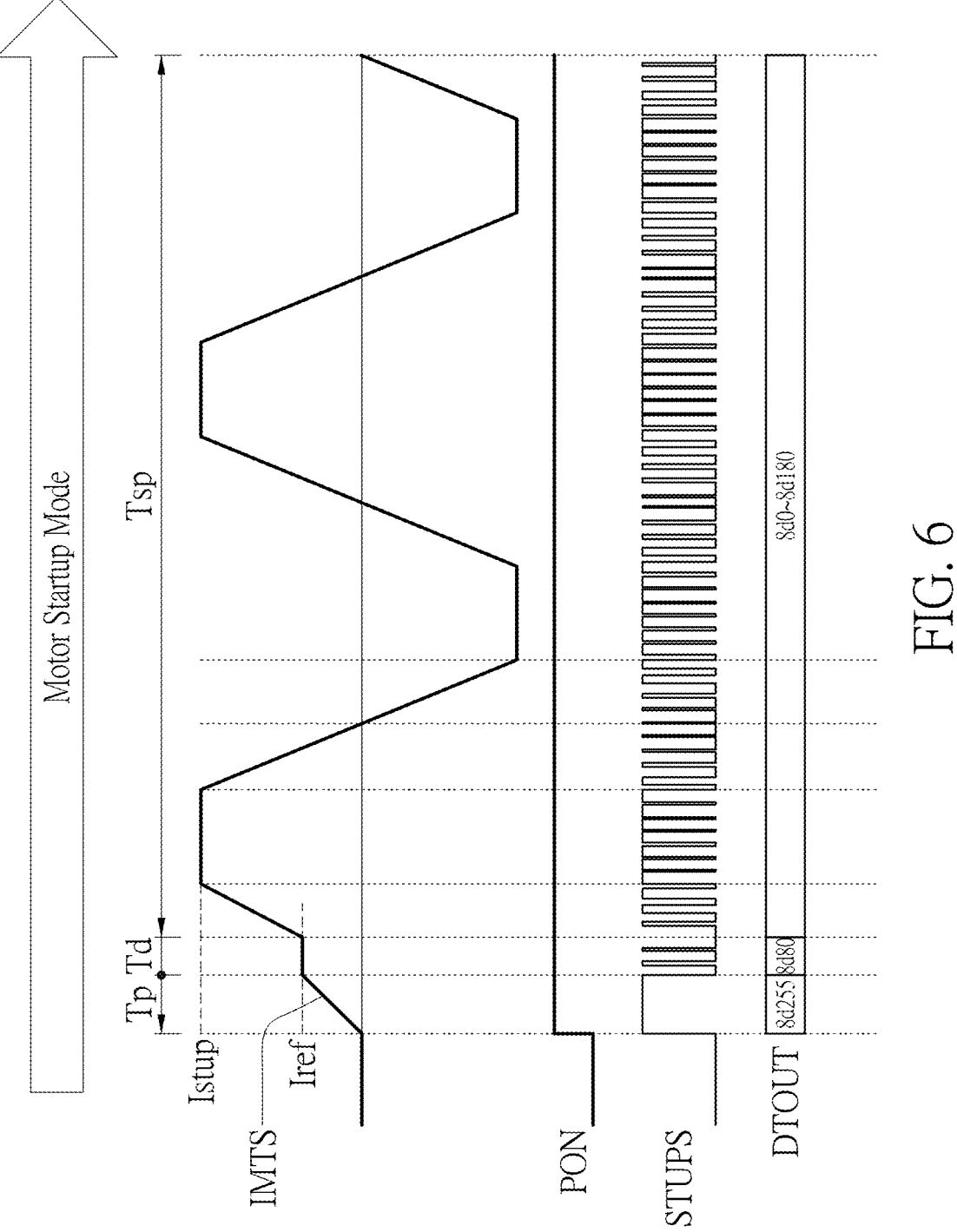
FIG. 6 is a waveform diagram of signals generated when a motor is started up by a motor driver for starting up a motor having any resistance in a motor startup mode according to a sixth embodiment of the present disclosure.

Reference is made to FIG. 6, which is a waveform diagram of signals generated when a motor is started up by a motor driver for starting up a motor having any resistance in a motor startup mode according to a sixth embodiment of the present disclosure.

The motor driver of the present disclosure starts up the motor MT from a time point at which a startup triggering signal PON transits from a low level to a high level that is a time point of a rising edge of one of a plurality of waveforms of the startup triggering signal PON as shown in FIG. 6.

Within an initial startup time interval Tp in the motor startup mode as shown in FIG. 6, the control circuit 11 shown in FIG. 2 outputs a startup control signal STUPS having the initial startup duty cycle such as 100% to the driving circuit 12. At this time, as shown in FIG. 6, a startup bit number signal DTOUT indicates that a code of the number of bits of the startup control signal STUPS is "8d" representing 8 bits, wherein "8" of the 8 bits as n is substituted into (2n−1) in the equation described herein to obtain a value "255".

The driving circuit 12 shown in FIG. 2 outputs the startup driving signal according to the startup control signal STUPS having the initial startup duty cycle such as 100%. The output stage circuit 13 shown in FIG. 2 operates to output the motor starting signal to the motor MT according to the startup driving signal for initially starting up the motor MT. As a result, as shown in FIG. 6, a current of a current signal IMTS of the motor MT is gradually increased.

When the current of the current signal IMTS of the motor MT is gradually increased within the initial startup time interval Tp in the motor startup mode, the current limiting circuit 20 may sense the current of the current signal IMTS of the motor MT for multiple times. The current signal Isns shown in FIG. 2 may be the same as the current signal IMTS shown in FIG. 6.

Within the initial startup time interval Tp shown in FIG. 6, the current limiting circuit 20 shown in FIG. 2 compares the current of the current signal IMTS of the motor MT sensed each time with the reference current value Iref to generate the current sensed result, then sets the plurality of pulse waves of the pulse width modulation signal PWMS according to the current sensed result, and then outputs the pulse width modulation signal PWMS.

At an end time point of the initial startup time interval Tp in the motor startup mode, the current of the current signal IMTS of the motor MT is increased to reach the reference current value Iref.

After the initial startup time interval in the motor startup mode ends, the motor driver of the present disclosure enters the duty cycle detection time interval in the motor startup mode.

Within the duty cycle detection time interval Td in the motor startup mode as shown in FIG. 6, the duty cycle detecting circuit 30 detects the duty cycles of the plurality of pulse waves of the pulse width modulation signal PWMS from the current limiting circuit 20 as the startup detection duty cycles to output the duty cycle detected signal DTS as shown in FIG. 2.

Within the initial startup time interval Tp in the motor startup mode as shown in FIG. 6, the control circuit 11 shown in FIG. 2 calculates a variable soft switching duty cycle by substituting the startup detection duty cycle instructed by the duty cycle detected signal DTS into an equation of:

$$DTsof = DTref \times DTmodu/(2n-1),$$

wherein DTsof represents a digital value of the variable soft switching duty cycle, VCC represents the common voltage coupled to the motor driving circuit 10, DTref represents the digital value of the startup detection duty cycle, DTmodu represents a digital value of a variable soft reference duty cycle, and n represents the number of bits (such as, but not limited to, 8 bits).

Within a modulation startup time interval Tsp in the motor startup mode as shown in FIG. 6, the control circuit 11 outputs the startup control signal STUPS having the variable soft switching duty cycle, the driving circuit 12 outputs the startup driving signal according to the startup control signal, and the output stage circuit 13 operates to output the motor starting signal to the motor MT according to the startup driving signal. As shown in FIG. 6, within the modulation startup time interval Tsp, the duty cycle of the startup control signal STUPS is the variable soft switching duty cycle being changed within a soft switching duty cycle range (such as, but not limited to, a range of 0% to 100%) over time.

Figure 7:
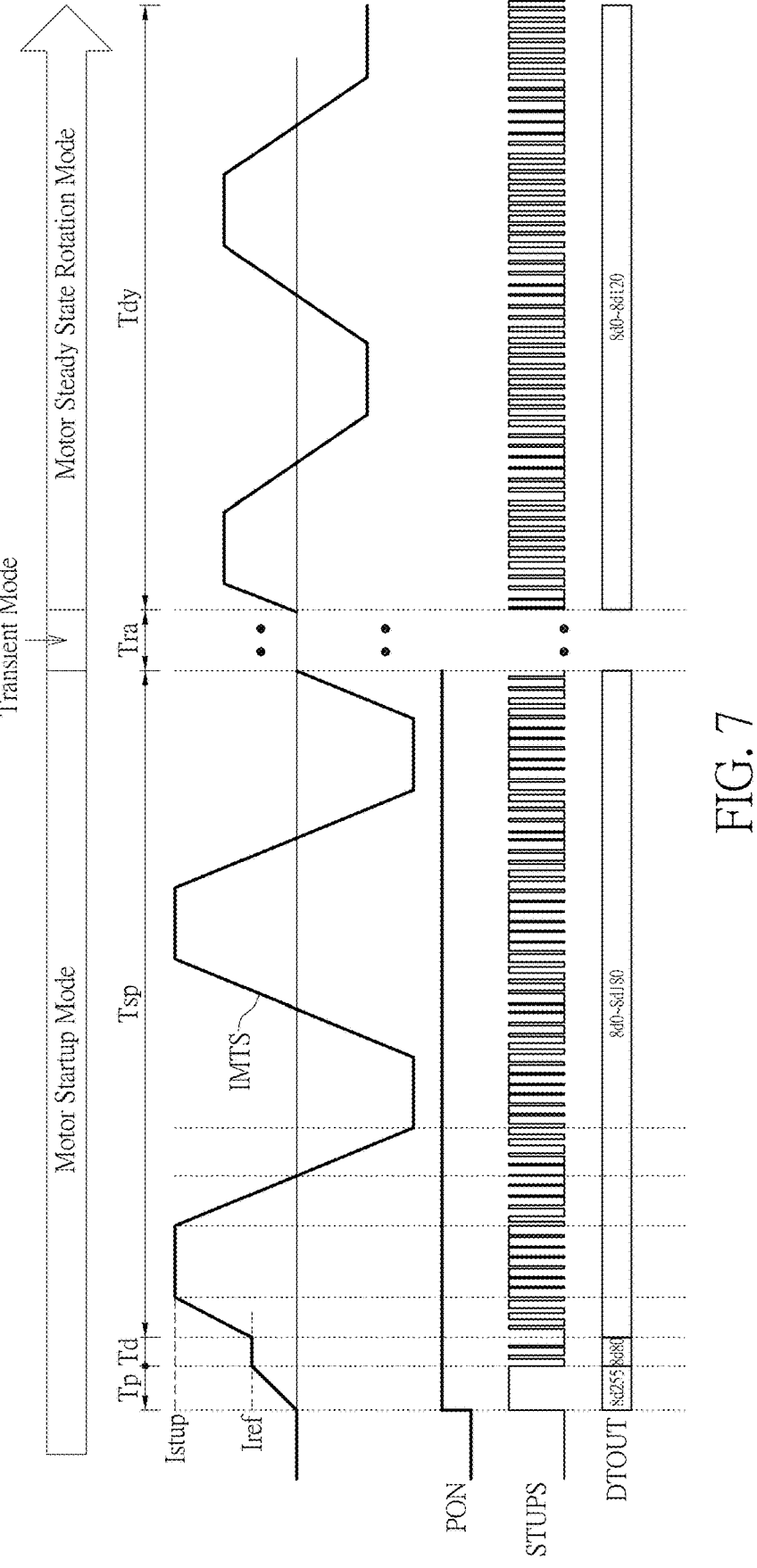
FIG. 7 is a waveform diagram of signals generated when a motor is started up in a motor startup mode and is driven in a motor steady state rotation mode by a motor driver for starting up a motor having any resistance according to a seventh embodiment of the present disclosure.

Reference is made to FIG. 7, which is a waveform diagram of signals generated when a motor is started up in a motor startup mode and is driven in a motor steady state rotation mode by a motor driver for starting up a motor having any resistance according to a seventh embodiment of the present disclosure.

The descriptions of the seventh embodiment of the present disclosure that are the same as the descriptions of the sixth embodiment of the present disclosure are not repeated herein.

In the seventh embodiment, after the motor startup mode Tsp shown in FIG. 6 ends, the motor driver of the present disclosure switches the motor MT from the motor startup mode to a transient mode. Within a motor transient time interval Tra in the transient mode, the motor driver of the present disclosure drives the motor MT such that a rotational speed of the motor MT is charged over time.

After the motor transient time interval Tra ends, the motor driver of the present disclosure enters the motor steady state rotation mode. Within a motor steady state rotation time interval Tdy in the motor steady state rotation mode, the motor driver of the present disclosure drives the motor MT to stably rotate.

Within the motor steady state rotation time interval Tdy in the motor steady state rotation mode, the target duty cycle setting circuit 40 shown in FIG. 2 may output the target duty cycle instructing signal DTCM according to the target rotation speed instructed by the target duty cycle target rotational speed instruction RPMCM. The motor driving circuit 10, according to the target duty cycle instructing signal DTCM, outputs the motor rotation driving signal to the motor MT for driving the motor MT to stably rotate.

Figure 8:
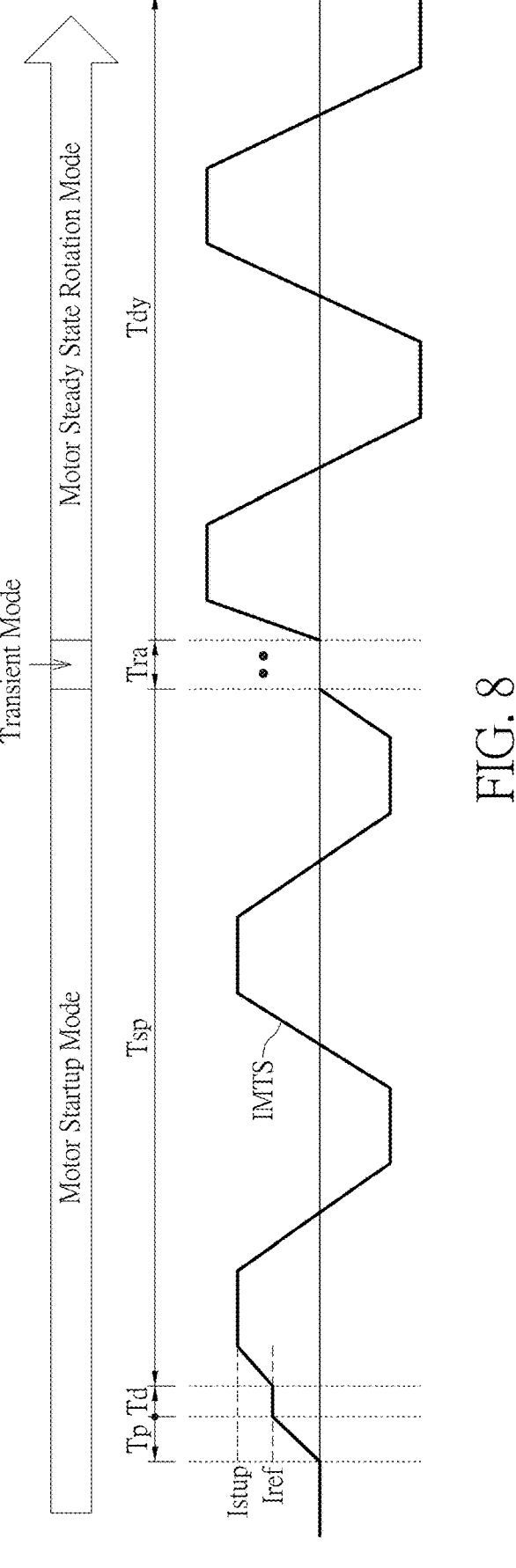
FIG. 8 is a waveform diagram of signals generated when a motor is started up in a motor startup mode and is driven in a motor steady state rotation mode by a motor driver for starting up a motor having any resistance according to an eighth embodiment of the present disclosure.

Reference is made to FIG. 8, which is a waveform diagram of signals generated when a motor is started up in a motor startup mode and is driven in a motor steady state rotation mode by a motor driver for starting up a motor having any resistance according to an eighth embodiment of the present disclosure.

For example, the current of the current signal IMTS of the motor MT started up by the motor driving circuit 10 shown in FIG. 1 or FIG. 2 in the motor startup mode may be smaller than that in the motor steady state rotation mode as shown in FIG. 8, but the present disclosure is not limited thereto.

In practice, the current of the current signal IMTS of the motor MT started up by the motor driving circuit 10 shown in FIG. 1 or FIG. 2 in the motor startup mode may be larger than that in the motor steady state rotation mode.

In conclusion, the present disclosure provides the motor driver for starting up the motor having any resistance. The motor driver of the present disclosure compares the current of the motor sensed for multiple times with the reference current value for setting the plurality of pulse waves of the pulse width modulation signal. Further, the motor driver of the present disclosure sets the motor starting signal for starting up the motor, according to the duty cycles of the plurality of pulse waves of the pulse width modulation signal. The motor driver of the present disclosure is capable of calculating the resistance of the motor according to the duty cycles of the plurality of pulse waves of the pulse width modulation signal, the common voltage and the reference current value. The motor driver of the present disclosure is capable of setting the motor starting signal according to the resistance of the motor. Therefore, when the motor driver of the present disclosure receives the common voltage having any voltage value for starting up the motor, the motor driver of the present disclosure adjusts a starting torque to an appropriate value (such as a constant value) that is larger than a minimum torque required for successfully starting up the motor, such that the current signal having a plurality of desired waveforms flows through the motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver for starting up a motor having any resistance, comprising: a motor driving circuit connected to a motor, and configured to output a motor starting signal to the motor according to an initial startup duty cycle within an initial startup time interval in a motor startup mode; a current limiting circuit connected to the motor, wherein the current limiting circuit, within the initial startup time interval in the motor startup mode, senses a current value of a current signal of the motor for multiple times, compares the current value of the current signal sensed each time with a reference current value to generate a current sensed result, sets a plurality of pulse waves of a pulse width modulation signal according to the current sensed result, and outputs the pulse width modulation signal; and a duty cycle detecting circuit connected to the current limiting circuit and the motor driving circuit, wherein the duty cycle detecting circuit, within a duty cycle detection time interval in the motor startup mode, detects a duty cycle of each of the plurality of pulse waves of the pulse width modulation signal as a startup detection duty cycle, and outputs a duty cycle detected signal according to the startup detection duty cycle of each of the plurality of pulse waves of the pulse width modulation signal; wherein the motor driving circuit, within a modulation startup time interval in the motor startup mode, sets a modulation startup duty cycle according to the duty cycle detected signal from the duty cycle detecting circuit, and outputs the motor starting signal to the motor according to the modulation startup duty cycle; wherein the motor driving circuit includes: a control circuit connected to the duty cycle detecting circuit, and configured to output a startup control signal having the initial startup duty cycle within the initial startup time interval in the motor startup mode; a driving circuit connected to the control circuit, and configured to output a startup driving signal according to the startup control signal within the initial startup time interval in the motor startup mode; and an output stage circuit connected to the driving circuit and the motor, and configured to operate to output the motor starting signal according to the startup driving signal within the initial startup time interval in the motor startup mode; wherein, within the modulation startup time interval in the motor startup mode, the control circuit sets a modulation startup duty cycle according to the duty cycle detected signal, the control circuit outputs the startup control signal according to the modulation startup duty cycle, the driving circuit outputs the startup driving signal according to the startup control signal, and the output stage circuit outputs the motor starting signal to the motor according to the startup driving signal.

2. The motor driver according to claim 1, wherein the motor driving circuit further includes: a rotor position detecting circuit disposed on the motor and connected to the control circuit; wherein, after the motor startup mode ends, the motor enters a motor steady state rotation mode; wherein in the motor startup mode, the motor steady state rotation mode or a combination thereof, the rotor position detecting circuit detects a position of a rotor of the motor to output a rotor position detected signal, and the control circuit controls the driving circuit according to the rotor position detected signal.

3. The motor driver according to claim 1, wherein the output stage circuit includes: a first high-side switch, wherein a first terminal of the first high-side switch is coupled with a common voltage; a first low-side switch, wherein a first terminal of the first low-side switch is connected to a second terminal of the first high-side switch, a node between the first terminal of the first low-side switch and the second terminal of the first high-side switch is connected to a first terminal of the motor, and a second terminal of the first low-side switch is grounded; a second high-side switch, wherein a first terminal of the second high-side switch is coupled with the common voltage; and a second low-side switch, wherein a first terminal of the second low-side switch is connected to a second terminal of the second high-side switch, a node between the first terminal of the second low-side switch and the second terminal of the second high-side switch is connected to a second terminal of the motor, and a second terminal of the second low-side switch is grounded; wherein a control terminal of the first high-side switch, a control terminal of the first low-side switch, a control terminal of the second high-side switch and a control terminal of the second low-side switch are connected to the driving circuit.

4. The motor driver according to claim 3, wherein the output stage circuit further includes:

a third high-side switch, wherein a first terminal of the third high-side switch is coupled with the common voltage; and a third low-side switch, wherein a first terminal of the third low-side switch is connected to a second terminal of the third high-side switch, a node between the first terminal of the third low-side switch and the second terminal of the third high-side switch is connected to a third terminal of the motor, and a second terminal of the third low-side switch is grounded;

wherein a control terminal of the third high-side switch and a control terminal of the third low-side switch are connected to the driving circuit.

5. The motor driver according to claim 1, wherein the motor driving circuit is continually coupled with a common voltage, and the motor driving circuit starts up and drives the motor by using the common voltage;

wherein, within the duty cycle detection time interval in the motor startup mode, the motor driving circuit estimates a resistance of the motor according to the common voltage, the duty cycle detected signal and the reference current value.

6. The motor driver according to claim 5, wherein, within the duty cycle detection time interval in the motor startup mode, the motor driving circuit sets the modulation startup duty cycle according to the resistance of the motor.

7. The motor driver according to claim 5, wherein, within the duty cycle detection time interval in the motor startup mode, the motor driving circuit calculates the resistance of the motor using an equation of:

$$Rmt = VCC \times PWMref/Iref,$$

wherein Rmt represents the resistance of the motor, VCC represents the common voltage, PWMref represents the duty cycle of each of the plurality of pulse waves of the pulse width modulation signal, and Iref represents the reference current value.

8. The motor driver according to claim 7, wherein, within the duty cycle detection time interval in the motor startup mode, the motor driving circuit sets the modulation startup duty cycle according to the resistance of the motor.

9. The motor driver according to claim 5, wherein, within the duty cycle detection time interval in the motor startup mode, the motor driving circuit calculates the resistance of the motor using an equation of:

$$Rmt = VCC \times \{DTref/(2n - 1)\}/Iref,$$

wherein Rmt represents the resistance of the motor, VCC represents the common voltage, DTref represents a digital value of the startup detection duty cycle, n represents a number of bit values, and Iref represents the reference current value.

10. The motor driver according to claim 9, wherein, within the duty cycle detection time interval in the motor startup mode, the motor driving circuit sets the modulation startup duty cycle according to the resistance of the motor.

11. The motor driver according to claim 1, wherein within the duty cycle detection time interval in the motor startup mode, the motor driving circuit multiplies the startup detection duty cycle by a preset gain to form the modulation startup duty cycle.

12. The motor driver according to claim 1, wherein, within the modulation startup time interval in the motor startup mode, the motor driving circuit performs an equation of:

$$DTstup = (Istup/Iref) \times DTref,$$

wherein DTstup represents a digital value of the modulation startup duty cycle, Istup represents a current of the motor, Iref represents the reference current value, and DTref represents a digital value of the startup detection duty cycle.

13. The motor driver according to claim 1, wherein, within the duty cycle detection time interval in the motor startup mode, the motor driving circuit calculates a variable soft switching duty cycle by substituting the startup detection duty cycle into an equation of:

$$DTsof = DTref \times DTmodu/(2n - 1),$$

wherein DTsof represents a digital value of the variable soft switching duty cycle, VCC represents the common voltage coupled to the motor driving circuit, DTref represents a digital value of the startup detection duty cycle, DTmodu represents a digital value of a variable soft reference duty cycle, and n represents a number of bits;

wherein, within the modulation startup time interval in the motor startup mode, the motor driving circuit outputs the motor starting signal to the motor according to the variable soft reference duty cycle.

14. The motor driver according to claim 1, wherein, within the duty cycle detection time interval in the motor startup mode, the duty cycle detecting circuit sets the startup detection duty cycle that is outputted when the current signal reaches the reference current value as a startup reference duty cycle, the duty cycle detecting circuit outputs the duty cycle detected signal according to the startup reference duty cycle, and the motor driving circuit sets the modulation startup duty cycle according to the startup reference duty cycle.

15. The motor driver according to claim 1, further comprising:

a target duty cycle setting circuit connected to the motor driving circuit;

wherein, after the motor startup mode ends, the motor enters a motor steady state rotation mode;

wherein, in the motor steady state rotation mode, the target duty cycle setting circuit outputs a target duty cycle instructing signal according to a target rotational speed instructed by a motor target rotational speed instruction, and the motor driving circuit outputs a rotation driving signal to the motor according to the target duty cycle instructing signal.

16. The motor driver according to claim 15, wherein a current of the motor started up by the motor driving circuit in the motor startup mode is smaller than the current of the motor started up by the motor driving circuit in the motor steady state rotation mode.

17. The motor driver according to claim 15, wherein a current of the motor started up by the motor driving circuit in the motor startup mode is larger than the current of the motor started up by the motor driving circuit in the motor steady state rotation mode.

18. The motor driver according to claim 1, wherein the motor is a single-phase motor.

19. The motor driver according to claim 1, wherein the motor is a three-phase motor.

\* \* \* \* \*